US009769530B2

(12) United States Patent
Lemus et al.

(10) Patent No.: US 9,769,530 B2
(45) Date of Patent: Sep. 19, 2017

(54) VIDEO-ON-DEMAND CONTENT BASED CHANNEL SURFING METHODS AND SYSTEMS

(71) Applicant: Verizon and Redbox Digital Entertainment Services, LLC, Basking Ridge, NJ (US)

(72) Inventors: Anthony Lemus, Irving, TX (US); Brian F. Roberts, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 340 days.

(21) Appl. No.: 13/906,273

(22) Filed: May 30, 2013

(65) Prior Publication Data
US 2014/0359669 A1    Dec. 4, 2014

(51) Int. Cl.
*H04N 21/472* (2011.01)
*H04N 21/482* (2011.01)
*H04N 21/2668* (2011.01)
*H04N 21/8549* (2011.01)

(52) U.S. Cl.
CPC ... *H04N 21/47202* (2013.01); *H04N 21/2668* (2013.01); *H04N 21/482* (2013.01); *H04N 21/8549* (2013.01)

(58) Field of Classification Search
CPC ........... H04N 21/47202; H04N 21/482; H04N 21/2668; H04N 21/8549
See application file for complete search history.

(56) References Cited

U.S. PATENT DOCUMENTS

| 6,668,377 | B1* | 12/2003 | Dunn | 725/92 |
| 2003/0093790 | A1* | 5/2003 | Logan | H04N 21/47202 725/38 |
| 2004/0205816 | A1* | 10/2004 | Barrett | 725/49 |
| 2008/0155613 | A1* | 6/2008 | Benya et al. | 725/89 |
| 2010/0306806 | A1* | 12/2010 | Kim et al. | 725/61 |
| 2012/0117583 | A1* | 5/2012 | Gunatilake | G06K 9/00744 725/19 |
| 2012/0151511 | A1* | 6/2012 | Bernard | H04N 21/4826 725/10 |
| 2012/0167125 | A1* | 6/2012 | Grubb | H04N 21/252 725/14 |

(Continued)

*Primary Examiner* — Pankaj Kumar
*Assistant Examiner* — Alexander Boyd

(57) ABSTRACT

An exemplary method includes a media content presentation system 1) maintaining a video-on-demand ("VOD") channel surfing list associated with a user of a media content access device, the VOD channel surfing list identifying a plurality of VOD content instances selected from a library of VOD content instances that are available by way of the media content access device during a VOD browsing session, 2) associating the VOD content instances identified in the VOD channel surfing list with a plurality of VOD channels, 3) detecting a channel surfing command provided by the user during the VOD browsing session, and 4) directing, in response to the channel surfing command, the media content access device to switch to a VOD channel included in the plurality of VOD channels that is presenting a video preview of a VOD content instance identified in the VOD channel surfing list and associated with the VOD channel.

22 Claims, 14 Drawing Sheets

(56) References Cited

U.S. PATENT DOCUMENTS

| | | | |
|---|---|---|---|
| 2013/0081084 A1* | 3/2013 | Scheer | H04N 21/4826 725/46 |
| 2014/0026052 A1* | 1/2014 | Thorwirth et al. | 715/721 |
| 2014/0067828 A1* | 3/2014 | Archibong | H04N 21/23 707/748 |
| 2014/0282661 A1* | 9/2014 | Martin | H04N 21/23418 725/18 |

* cited by examiner

VIDEO-ON-DEMAND CONTENT BASED CHANNEL SURFING METHODS AND SYSTEMS

BACKGROUND INFORMATION

Video-on-demand ("VOD") content offerings have proliferated in recent years as media content providers have expanded and continue to expand the media content choices available to users by way of set-top box devices, televisions, mobile devices, and other types of media content access devices. For example, thousands of VOD content instances are now available for instant streaming by way of REDBOX INSTANT, NETFLIX, and other types of subscription-based VOD content services.

Users of VOD content services often like to browse through listings of VOD content offered by the VOD content services in order to discover particular VOD content instances that may be of interest to the users. For example, a user may browse through various graphical movie posters representative of different movies available for streaming by way of a particular VOD content service in an effort to find a movie that the user would like to watch.

Unfortunately, because there are so many VOD content instances to choose from in a typical VOD content library offered by a VOD content service, a user browsing through the VOD content library may have difficulty locating VOD content instances that are actually of interest to the user. Moreover, while browsing through the VOD content library, the user will often skip over a VOD content instance that he or she would enjoy watching because the graphical movie poster or other static image representative of the VOD content instance is not appealing to the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
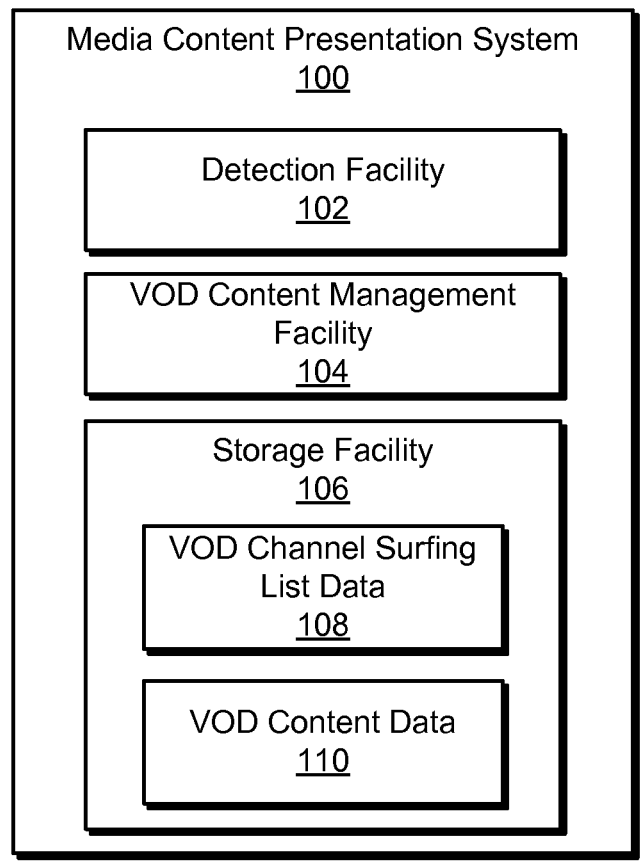
FIG. 1 illustrates an exemplary media content presentation system according to principles described herein.

VOD content based channel surfing methods and systems are described herein. As will be described below, a media content presentation system may 1) maintain a VOD channel surfing list associated with a user of a media content access device, the VOD channel surfing list identifying a plurality of VOD content instances selected from a library of VOD content instances that are available by way of the media content access device during a VOD browsing session, 2) associate the VOD content instances identified in the VOD channel surfing list with a plurality of VOD channels, 3) detect a channel surfing command provided by the user during the VOD browsing session, and 4) direct, in response to the channel surfing command, the media content access device to switch to a VOD channel included in the plurality of VOD channels that is presenting a video preview of a VOD content instance identified in the VOD channel surfing list and associated with the VOD channel.

As used herein, a "VOD content instance" refers to any video-based media content instance that may be accessed (e.g., viewed) by a user by way of a media content access device (e.g., a set-top box device, a television, a computing device, etc.) in an on-demand manner. An exemplary VOD content instance may include, but is not limited to, a movie, a video, a television program, and/or any other type of media content that may be streamed or otherwise presented on-demand in response to a request provided by the user to view or otherwise access the VOD content instance. A VOD content instance may be provided by a VOD content provider (e.g., a subscriber television service provider, an Internet service provider, a streaming media content provider, etc.) by way of a VOD content service (e.g., a subscriber television service, a streaming media content service, a subscription-based media content service, etc.)

Channel surfing (i.e., the practice of scanning through different television channels by providing "channel up," "channel down," and other commands with a remote control or other type of input device) has long been an effective way for a user to discover television programs that may be of interest to the user. The methods and systems described herein may allow a user to use traditional channel surfing commands (e.g., channel up and down commands) in the context of a VOD content service to discover VOD content that may be of interest to the user. By so doing, the methods and systems described herein may provide a user with an intuitive, effective, and efficient way to browse through a library of VOD content instances available by way of a VOD content service.

To illustrate, a user may initiate a VOD browsing session on a media content access device in order to browse through a library of VOD content instances available by way of a VOD content service. Instead of (or in addition to) a menu of static images (e.g., movie posters) representative of various VOD content instances included in the VOD content library being presented to the user, a video preview of a particular VOD content instance (e.g., a trailer of the VOD content instance, an in-progress presentation of the VOD content instance itself, etc.) identified in a VOD channel surfing list (e.g., a list identifying recommended VOD content instances for the user) may be presented to the user. The user may watch the video preview and decide to watch the VOD content instance in its entirety, save the VOD content instance to an instant queue for later access, and/or otherwise access the VOD content instance. At any point during the presentation of the video preview, the user may provide a channel surfing command (e.g., by pressing a channel up or channel down button on a remote control device) to "change" the VOD channel and view a video preview of a different VOD content instance identified in the VOD channel surfing list. The user may continue channel surfing in this manner until he or she discovers a VOD content instance that he or she would like to watch.

As will be described below, each video preview presented by the various VOD channels to which the media content access device may switch (e.g., tune) may be presented in accordance with an always-on video presentation heuristic. In this manner, when the user directs the media content access device to switch to a particular VOD channel, the video preview being presented by the VOD channel may appear to the user to be "in progress," thereby providing a channel surfing experience for the user that emulates that of traditional television.

FIG. 1 illustrates an exemplary media content presentation system 100 ("system 100"). As shown, system 100 may include, without limitation, a detection facility 102, a VOD content management facility 104 ("management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect one or more channel surfing commands provided by a user of a media content access device ("access device") during a VOD browsing session. As used herein, a "VOD browsing session" refers to a time period during which a user browses through a VOD content library provided by a VOD content provider. A VOD browsing session may be initiated in any suitable manner (e.g., by providing one or more commands with a remote control device to access the VOD content library, initiating an application associated with a VOD content service, etc.).

A channel surfing command as detected by detection facility 102 may be provided by a user in any suitable manner and by way of any suitable user input device communicatively coupled to or a part of the access device. For example, the user may provide a channel surfing command by way of a remote control device configured to communicate with the access device.

Figure 2:
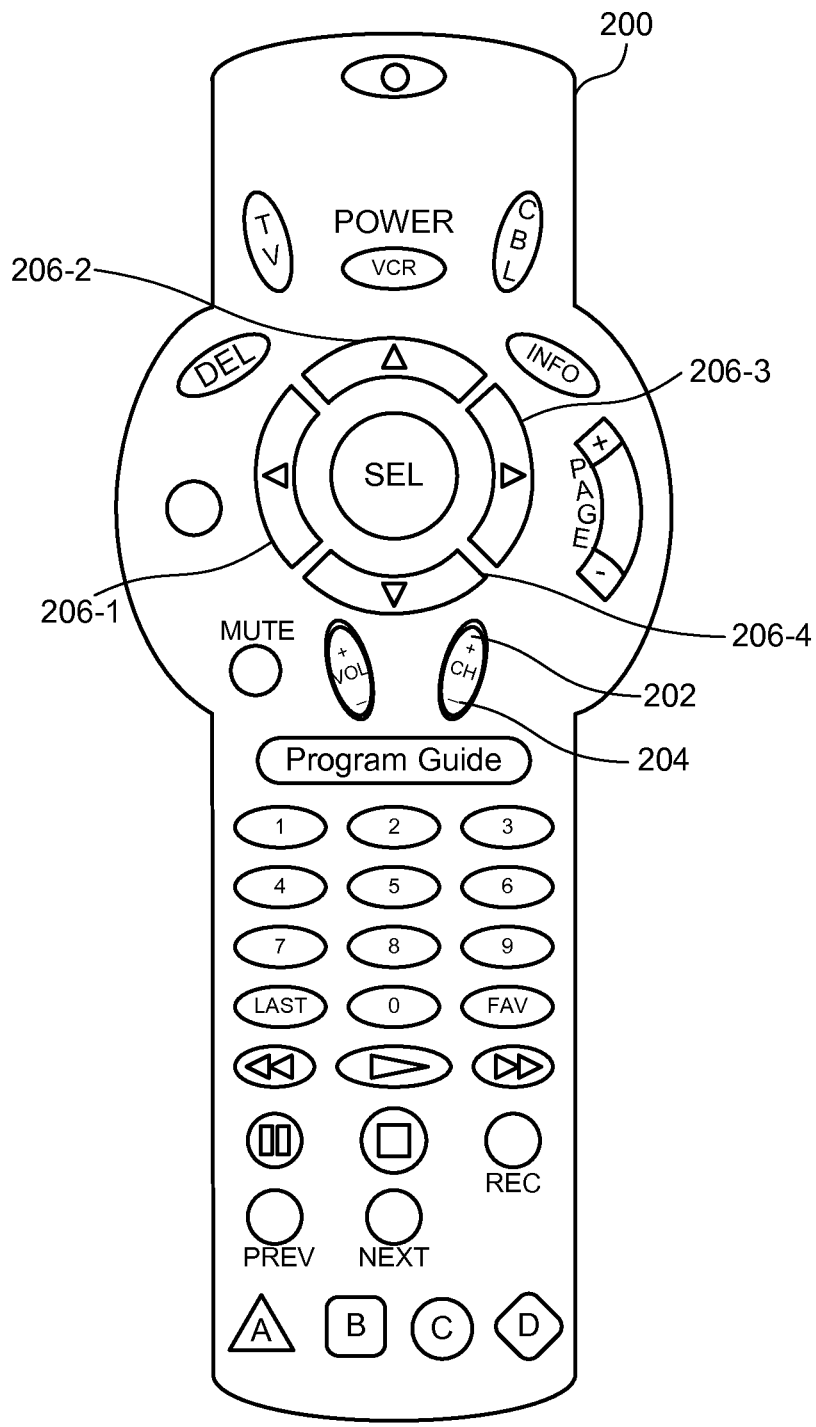
FIG. 2 shows an exemplary remote control device according to principles described herein.

To illustrate, FIG. 2 shows an exemplary remote control device 200 that may be used to provide one or more channel surfing commands. As shown, remote control device 200 may include a variety of buttons, one or more of which may be used to provide channel surfing commands. For example, a user may press channel up and down buttons 202 and 204, one or more of navigational buttons 206-1 through 206-4, and/or any other button as may serve a particular implementation in order to provide the one or more channel surfing commands.

Figure 3:
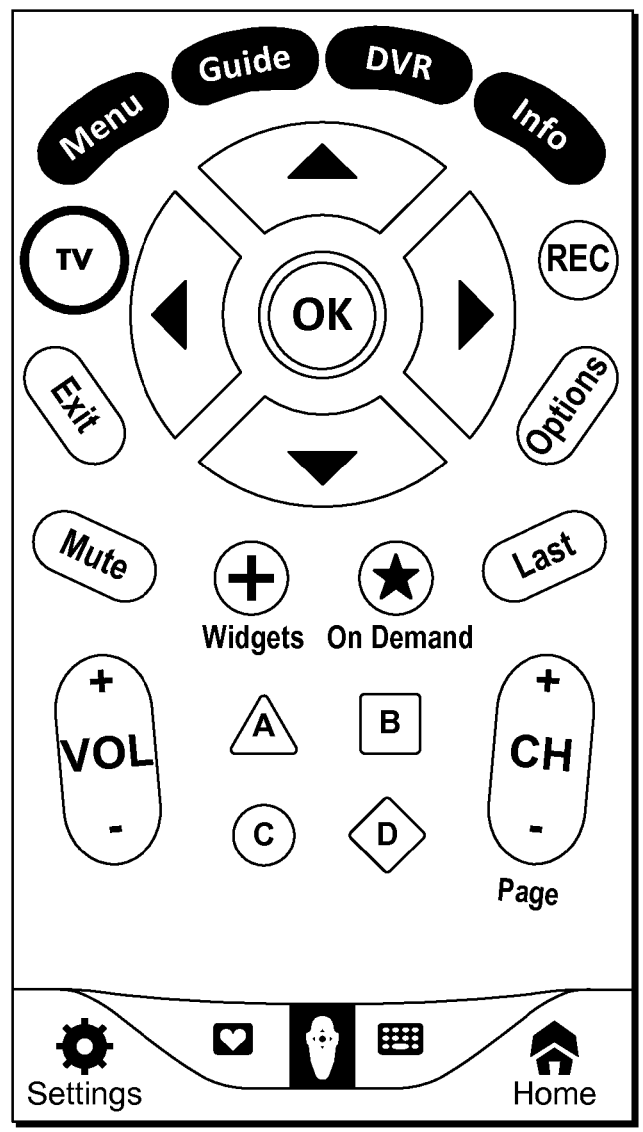
FIG. 3 shows an exemplary remote control device emulation graphical user interface that may be displayed on a display screen of a mobile device configured to emulate a remote control device according to principles described herein.

Remote control device 200 is merely illustrative of one of the many different types of user input devices that may be used to provide channel surfing commands associated with an access device. Other exemplary user input devices include, but are not limited to, a keyboard, a mouse, a touch screen, etc. In some examples, the channel surfing commands may be provided by way of a mobile device (e.g., a mobile phone or a tablet computer) configured to emulate a remote control device. To illustrate, FIG. 3 shows an exemplary remote control device emulation graphical user interface ("GUI") 300 that may be displayed on a display screen of a mobile device configured to emulate a remote control device. As shown, GUI 300 may include various graphical objects representing many of the same user input buttons (e.g., buttons 202-206) that are a part of remote control device 200. A user may interact with (e.g., select) one or more of these graphical objects in order to perform one or more channel surfing commands and/or provide any other type of input configured to control an operation of an access device.

A user may provide a channel surfing command in any other suitable manner. For example, a user may be utilizing a touch screen device (e.g., a mobile phone or a tablet computer) to access a library of VOD content. In this example, one or more touch gestures may be performed by the user to provide a channel surfing command. To illustrate, the user may swipe to the right or to the left on the touch screen device in order to provide channel up and channel down commands. As another example, a user may be utilizing a display screen associated with a personal computer to access a library of VOD content. In this example, one or more graphical objects representative of channel up and down commands may be displayed in the display screen and selected by the user in any suitable manner (e.g., with a mouse, keyboard, etc.) to provide a channel surfing command.

Returning to FIG. 1, management facility 104 may be configured to perform one or more VOD content management operations. For example, management facility 104 may maintain a VOD channel surfing list associated with a user of a media content access device. The VOD channel surfing list may identify a plurality of VOD content instances selected from a library of VOD content instances that are available by way of the media content access device during a VOD browsing session. In some examples, the VOD channel surfing list identifies only a subset of VOD content instances included in the library of VOD content instances (e.g., a group of recommended VOD content instances for the user). It will be recognized that the VOD channel surfing list may alternatively identify any number of VOD content instances included in the library of VOD content instances as may serve a particular implementation.

Management facility 104 may maintain the VOD channel surfing list associated with the user of the media content access device in any suitable manner. For example, management facility 104 may maintain the VOD channel surfing list by identifying a particular VOD content instance included in the library of VOD content instances as being potentially of interest to the user and including the VOD content instance in the VOD channel surfing list (e.g., by including data in the VOD channel surfing list that identifies the VOD content instance). In this manner, the VOD channel surfing list may be specific to (i.e., personalized to) the user.

Management facility 104 may identify a VOD content instance as being potentially of interest to the user in any suitable manner. For example, management facility 104 may identify a VOD content instance as being potentially of interest to the user based on one or more preferences specified by the user.

To illustrate, management facility 104 may present a user interface to the user in which the user may select various VOD content attributes in which he or she is interested. For example, the user may indicate that he or she is interested in comedies, short films, and movies filmed in high definition. Management facility 104 may then identify one or more VOD content instances that match one or more of the attributes specified by the user (e.g., by analyzing metadata associated with the one or more VOD content instances) and include the identified one or more VOD content instances in the VOD channel surfing list.

Additionally or alternatively, management facility 104 may identify a VOD content instance as being potentially of interest to the user based on a viewing history associated with the user. For example, management facility 104 may maintain a viewing history log representative of VOD content instances watched by the user prior to the VOD browsing session. Management facility 104 may identify one or more VOD content instances available during the VOD browsing session that have metadata matching or similar to metadata associated with the previously watched VOD content instances. In this manner, VOD content instances similar in type, genre, etc. to those already watched by the user may be selected for inclusion in the VOD channel surfing list associated with the user. Viewing history log data associated with one or more social media contacts of the user and/or of any other user may be used in a similar manner to select VOD content instances for inclusion in the VOD channel surfing list associated with the user.

Additionally or alternatively, management facility 104 may identify a VOD content instance as being potentially of interest to the user based on contents of an instant queue of VOD content instances maintained by the user. For example, the user may have added various VOD content instances to an instant queue (i.e., a list of content instances saved for later access by the user). By adding the VOD content instances to the instant queue, the user has shown at least some interest in the VOD content instances. Management facility 104 may accordingly identify metadata values associated with the VOD content instances in the instant queue and select a VOD content instance that matches at least one of the metadata values for inclusion in the VOD channel surfing list.

Additionally or alternatively, management facility 104 may identify a VOD content instance as being potentially of interest to the user based on an amount of time that the user spends watching a particular VOD channel. For example, while the user is channel surfing, he or she may pause channel surfing for an extended period of time to view a video preview of a particular VOD content instance. Based on this, management facility 104 may determine that the user is interested in VOD content instances that share one or more attributes with the VOD content instance associated with the video preview.

Additionally or alternatively, management facility 104 may identify a VOD content instance as being potentially of interest to the user based on a user profile associated with the user and/or one or more other users (e.g., one or more social media contacts of the user). For example, a user profile associated with a particular user may indicate that the user is male, twenty-one years old, and often watches NASCAR racing. System 100 may use this information to select one or more VOD content instances associated with car racing for inclusion in the VOD channel surfing list associated with the user.

Additionally or alternatively, management facility 104 may identify a VOD content instance as being potentially of interest to the user based on a popularity of the particular VOD content instance. The popularity of the VOD content instance may be determined in any suitable manner. For example, one or more users (e.g., one or more subscribers to a VOD content service providing the VOD content instance, one or more social media contacts of the user, and/or any other user) may rate the VOD content instance. The popularity of the VOD content instance may be based on these ratings. Additionally or alternatively, the popularity of the VOD content instance may be based on the number of times the VOD content instance is watched or otherwise accessed by other users and/or on any other factor as may serve a particular implementation.

Additionally or alternatively, management facility 104 may identify a VOD content instance as being potentially of interest to the user based on activity of one or more social media contacts of the user. For example, management facility 104 may identify VOD content instances being experienced in real-time by social media contacts of the user during the VOD browsing session and dynamically add the VOD content instances to the VOD channel surfing list. The VOD content instances being experienced in real-time by social media contacts of the user during the VOD browsing session may be identified in any suitable manner. For example, management facility 104 may identify keywords included in one or more social media posts made by the social media contacts and identify the VOD content instances based on the identified keywords.

To illustrate, a social media contact of the user (e.g., a person whom the user is following on Twitter or a person whom the user is friends with on Facebook or any other social media website) may make a social media post (e.g., a Tweet or a Facebook post) that he or she is watching a particular VOD content instance (e.g., a VOD content instance entitled "Survivor"). Management facility 104 may analyze the social media post and determine that it includes one or more keywords (e.g., one or more words marked with a hashtag or the like) associated with the VOD content instance. Such words may include words included in the title of the VOD content instance, words descriptive of one or more people associated with the VOD content instance, and/or any other word associated with the VOD content instance. For example, the social media post may include the following: "Watching # Survivor right now . . . awesome episode!" Management facility 104 may use one or more of these words and symbols to determine that the social media contact is watching a VOD content instance entitled "Survivor."

Additionally or alternatively, management facility 104 may identify one or more VOD content instances being experienced in real-time by social media contacts of the user during the VOD browsing session based on log data generated or otherwise provided by a VOD content service provider. For example, management facility 104 access log data provided by a VOD content service provider that indicates that a social media contact of the user is accessing (e.g., watching) a particular VOD content instance.

Management facility 104 may determine whether to dynamically add a VOD content instance identified as being experienced in real-time by a social media contact of the user to the VOD channel surfing list in any suitable manner. For example, management facility 104 may perform further analysis of the social media post provided by the social media contact to determine whether the social media contact actually likes the VOD content instance. For example, referring again to the "Survivor" social media post provided above, management facility 104 may detect the word "awesome" and the exclamation point and determine that the social media content likes the VOD content instance and that he or she would recommend it to his or her friends. Based on this information, management facility 104 may add the VOD content instance entitled "Survivor" to the VOD channel surfing list.

Additionally or alternatively, management facility 104 may identify a VOD content instance as being potentially of interest to the user based on one or more metadata values associated with the VOD content instance. For example, metadata values associated with the VOD content instance may identify one or more attributes (e.g., genre, actors, resolution, rating, duration, etc.) of the VOD content instance. Based on these metadata values, management facility 104 may include the VOD content instance in one or more VOD channel surfing lists as may serve a particular implementation.

It will be recognized that the examples provided above of identifying a VOD content instance as being potentially of interest to a user are merely illustrative. Additional or alternative ways of identifying a VOD content instance as being potentially of interest to a user may be used in accordance with the methods and systems described herein.

In some examples, management facility 104 may dynamically maintain the VOD channel surfing list. For example, management facility 104 may dynamically add one or more VOD content instances to the VOD channel surfing list as the one or more VOD content instances become available and/or in response to a change in any of the factors used in determining whether a VOD content instance is potentially of interest to the user.

As another example, management facility 104 may dynamically maintain the VOD channel surfing list by dynamically removing one or more VOD content instances from the VOD channel surfing list. For example, management facility 104 may detect that a VOD content instance included in the VOD channel surfing list is no longer available, and, in response, dynamically remove the VOD content instance from the VOD channel surfing list. As another example, management facility 104 may limit the VOD channel surfing list to include a predetermined number of VOD content instances. In this case, a VOD content instance may be removed from the VOD channel surfing list if another VOD content instance identified as being relatively more likely to be of interest to the user is selected for inclusion of the VOD channel surfing list. A VOD content instance may be dynamically removed from the VOD channel surfing list for any other reason as may serve a particular implementation.

Additionally or alternatively, management facility 104 may dynamically maintain the VOD channel surfing list by dynamically ranking the VOD content instances included in the VOD channel surfing list and determining a presentation order of the VOD content instances (i.e., an order in which video previews of the VOD content instances are presented to the user in response to channel surfing commands provided by the user) based on the ranking of each of the VOD content instances. The ranking may be performed in accordance with any suitable ranking heuristic. For example, management facility 104 may rank the VOD content instances based on a popularity of the VOD content instances among the user's social media contacts, user ratings of the VOD content instances, user profile information associated with the user and/or one or more social media contacts of the user, metadata associated with the VOD content instances, and/or any other factor as may serve a particular implementation.

Management facility 104 may be further configured to associate the VOD content instances identified in the VOD channel surfing list with a plurality of VOD channels. As used herein, a "VOD channel" refers to any communication channel or carrier used to deliver and/or present a VOD content instance. For example, a VOD channel may include or be identified by a television channel, a media content stream (e.g., an IP stream), an address (e.g., a network address), a frequency (e.g., a radio frequency), or other carrier of media content. As will be described below, an access device may switch to a VOD channel by tuning to a particular frequency, processing a media content stream, opening a network address, and/or otherwise begin presenting a VOD content instance carried by the VOD channel.

Management facility 104 may associate the VOD content instances identified in the VOD channel surfing list with a plurality of VOD channels in any suitable manner. For example, management facility 104 may assign each VOD content instance identified in the VOD channel surfing list to a distinct VOD channel such that each VOD content instance is associated with a single VOD channel. As will be described below, by associating a VOD content instance with a VOD channel, a video preview of the VOD content instance may be presented by way of the VOD channel to the user when the user provides a channel surfing command for the access device to switch to the VOD channel.

As mentioned, detection facility 102 may detect a channel surfing command provided by a user of an access device during a VOD browsing session. In response to the channel surfing command, management facility 104 may direct the access device to switch to a VOD channel that is presenting a video preview of a VOD content instance identified in the VOD channel surfing list and associated with the VOD channel.

As used herein, a "video preview" of a VOD content instance may include any video-based presentation of at least a portion of the VOD content instance. For example, a video preview of a VOD content instance may include a trailer of the VOD content instance (e.g., video content that includes one or more scenes of the VOD content instance).

Additionally or alternatively, the video preview of the VOD content instance may include an in-progress presentation of the VOD content instance. As used herein, an "in-progress" presentation of a VOD content instance refers to a presentation of the VOD content instance that is in progress when the access device switches to the VOD content channel associated with the VOD content instance. For example, when an access device switches to a VOD content channel presenting an in-progress presentation of a movie, a scene in the middle of the movie may be presented to the user in a manner that may make the user think that the movie has been playing on the VOD channel for some time.

Figure 4:
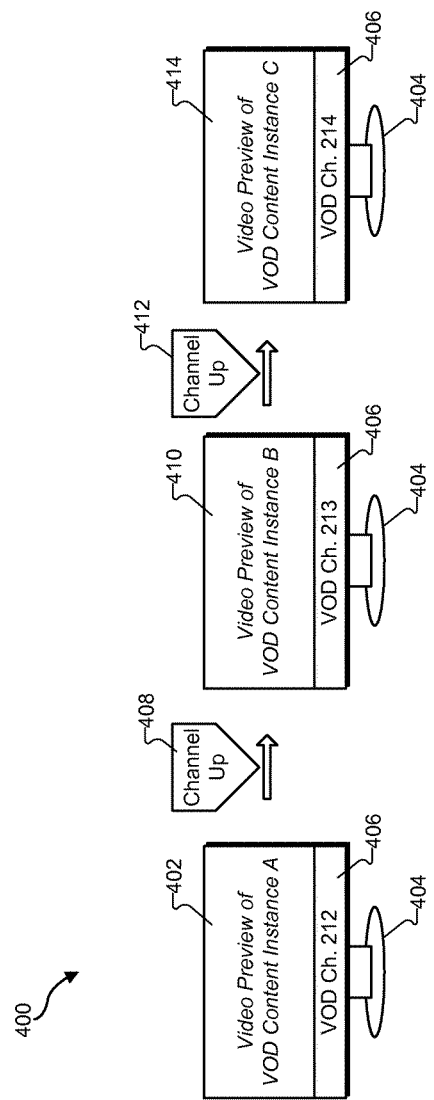
FIGS. 4-5 illustrate exemplary presentation sequences that may be realized in response to a sequence of channel surfing commands provided by a user according to principles described herein.

FIG. 4 illustrates an exemplary presentation sequence 400 that may be realized in response to a sequence of channel surfing commands provided by a user. As shown, a video preview 402 of a first VOD content instance (labeled "VOD content instance A" in FIG. 4) identified in a VOD channel surfing list associated with the user may be initially presented by way of a display device 404 associated with an access device. Display device 404 may include a television, a computer monitor, a display screen integrated into an access device, and/or any other type of display as may serve a particular implementation. As shown in FIG. 4, video preview 402 may occupy substantially an entire display area of display device 404. Alternatively, video preview 402 may be presented within a window that occupies only a portion of the display area of display device 404.

Information associated with video preview 402 may be presented concurrently with video preview 402. For example, as shown, a banner 406 including information identifying a channel number of the VOD channel associated with video preview 402 (i.e., VOD channel number "212") may be presented concurrently with video preview 402. In some examples, banner 406 may be presented for only a predetermined amount of time (e.g., a few seconds) after the access device switches to the VOD channel presenting video preview 402.

As shown, the user may provide a channel up command 408 while video preview 402 is being presented. In response, management facility 104 may direct the access device to switch to a second VOD channel (i.e., a VOD channel having a number of "213") that is presenting a video preview 410 of a second VOD content instance (labeled "VOD content instance B" in FIG. 4) identified in the VOD channel surfing list. The user may interact with video preview 410 in any suitable manner (examples of which will be described in more detail below).

In like manner, the user may provide another channel up command 412 while video preview 410 is being presented. In response, management facility 104 may direct the access device to switch to a third VOD channel (i.e., a VOD channel having a number of "214") that is presenting a video preview 414 of a third VOD content instance (labeled "VOD content instance C" in FIG. 4) identified in the VOD channel surfing list. The user may interact with video preview 414 in any suitable manner (examples of which will be described in more detail below).

In some examples, management facility 104 may provide a video preview of a VOD content instance for presentation by way of a VOD channel. For example, management facility 104 may stream the video preview of the VOD content instance by way of the VOD channel in accordance with an always-on video presentation heuristic. As used herein, an "always-on" video presentation heuristic refers to any video presentation heuristic that causes the video preview to be always playing on the VOD channel (e.g., in a repeating manner). In this manner, the user may see different portions of the video preview depending on the timing of when the access device switches to the VOD channel.

In some examples, management facility 104 may personalize a video preview of a VOD content instance to the user. In other words, management facility 104 may generate, select, and/or present different video previews of the same VOD content instance to different users. Each video preview may include content selected to be of interest to a particular user. Management facility 104 may personalize a video preview of a VOD content instance to the user in any suitable manner. For example, management facility 104 may identify a portion of the VOD content instance as being potentially of interest to the user and designate the identified portion as the video preview of the VOD content instance. This may be done in any suitable manner, including in any of the manners described above with respect to identifying VOD content instances as being potentially of interest to the user.

For example, management facility 104 may identify a portion of a VOD content instance as being potentially of interest to the user based on one or more preferences specified by the user. To illustrate, the user may specify (e.g., by way of a user interface provided by management facility 104) that the user is interested in fight scenes. Management facility 104 may accordingly identify one or more fight scenes included in the VOD content instance and combine the one or more fight scenes into a video preview of the VOD content instance. In this manner, when the user views the video preview, he or she may be more interested in watching the video preview and/or the VOD content instance associated with the video preview than if he or she sees a video preview that includes non-fight scenes included in the VOD content instance. As another example, the user may specify that he or she is interested in scenes in which a particular actor appears. Management facility 104 may accordingly identify one or more scenes included in the VOD content instance in which the actor appears and designate the one or more scenes as being a video preview of the VOD content instance that is to be presented to the user.

Additionally or alternatively, management facility 104 may identify a portion of a VOD content instance as being potentially of interest to the user based on a viewing history associated with the user. For example, the viewing history associated with the user may include a relatively high number of VOD content instances that include fight scenes. Management facility 104 may accordingly identify one or more fight scenes included in the VOD content instance and combine the one or more fight scenes into a video preview of the VOD content instance.

Additionally or alternatively, management facility 104 may identify a portion of a VOD content instance as being potentially of interest to the user based on a user profile associated with the user and/or one or more other users (e.g., one or more social media contacts of the user). For example, a user profile associated with a particular user may indicate that the user is a twenty-two year old female. Management facility 104 may accordingly identify one or more scenes included in the VOD content instance that appeal to women in this demographic and combine the identified scenes into a video preview of the VOD content instance for presentation to the user.

Additionally or alternatively, management facility 104 may identify a portion of a VOD content instance as being potentially of interest to the user based on a popularity of one or more scenes included in the VOD content instance. For example, a particular scene included in the VOD content instance may be determined in any suitable manner to be the most popular scene in the VOD content instance. Management facility 104 may accordingly designate the scene as being a video preview of the VOD content instance that is to be presented to the user.

Management facility 104 may identify a portion of a VOD content instance as being potentially of interest to the user in any other manner as may serve a particular implementation. For example, management facility 104 may identify a portion of a VOD content instance as being potentially of interest to the user based on activity of one or more social media contacts of the user, one or more metadata values associated with one or more scenes included in the VOD content instance, and/or in any other manner.

As mentioned, a video preview of a VOD content instance may be presented in a repeating manner (i.e., the video preview automatically begins playing again after it ends). In some alternative examples, multiple video previews of the same VOD content instance may be maintained by management facility 104. In this manner, each time the user accesses a VOD channel associated with the VOD content instance, a different video preview of the VOD content instance may be presented to the user.

Figure 5:
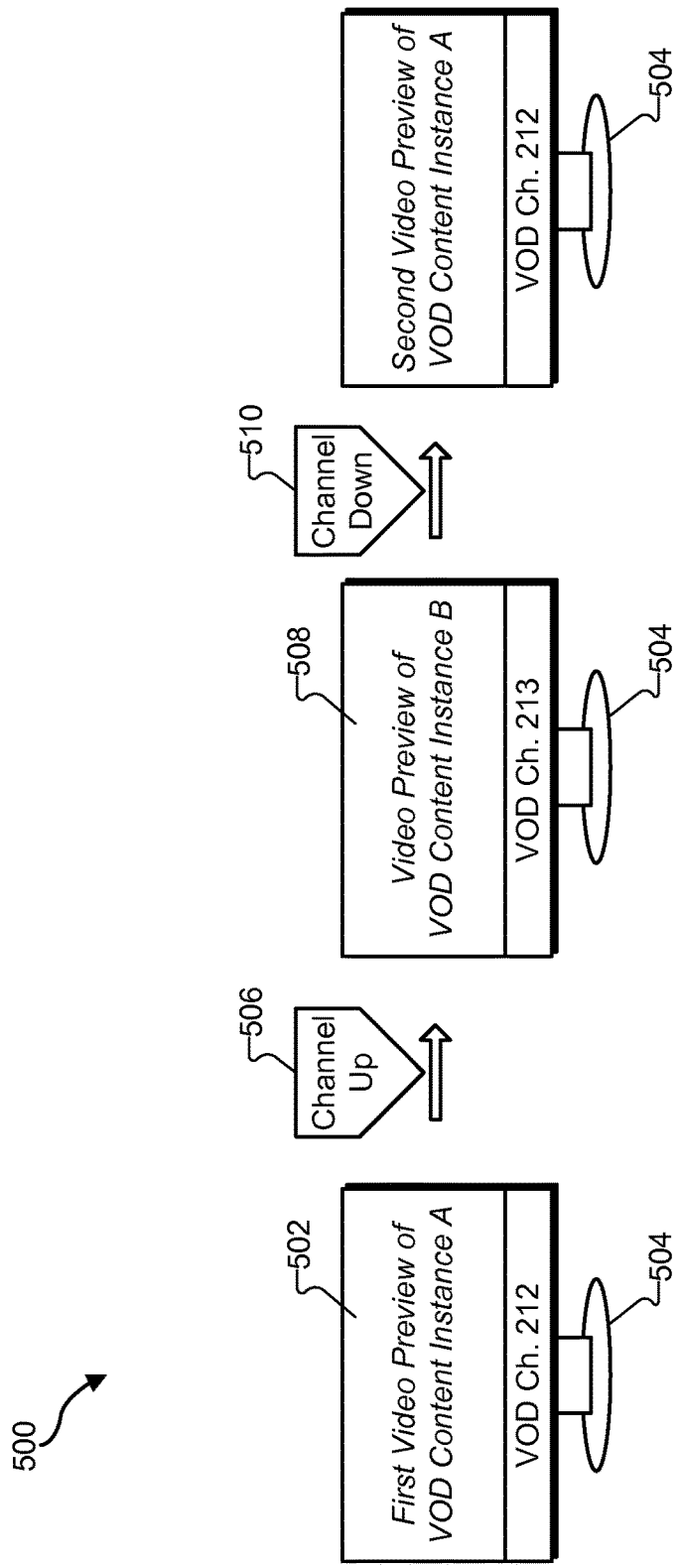

To illustrate, FIG. 5 illustrates another exemplary presentation sequence 500 that may be realized in response to a sequence of channel surfing commands provided by a user. In the example of FIG. 5, a video preview 502 of a first VOD content instance (labeled "VOD content instance A" in FIG. 5) identified in a VOD channel surfing list associated with the user may be initially presented by way of a display device 504 associated with an access device. While video preview 502 is being presented, the user may provide a channel up command 506. In response, management facility 104 may direct the access device to switch to a second VOD channel (i.e., a VOD channel having a number of "213") that is presenting a video preview 508 of a second VOD content instance (labeled "VOD content instance B" in FIG. 5) identified in the VOD channel surfing list.

At any time subsequent to providing the channel up command 506, the user may provide a channel down command 510. In response, management facility 104 may direct the access device to switch back to the first VOD channel (i.e., the VOD channel having a number of "212"). As shown in FIG. 5, the first VOD channel may now be presenting a second video preview of the first VOD content instance. The second video preview may include additional or alternative video content than the first video preview of the first VOD content instance.

In some examples, a video preview of a VOD content instance identified in a VOD channel surfing list associated with a user may be presented in response to an initiation of a VOD browsing session. For example, as described above, a user may initiate a VOD browsing session on an access device in order to browse through a library of VOD content instances available by way of a VOD content service. Instead of (or in addition to) a menu of static images (e.g., movie posters) representative of various VOD content instances included in the VOD content library being presented to the user, a video preview of a particular VOD content instance identified in a VOD channel surfing list (e.g., a list identifying recommended VOD content instances for the user) may be presented to the user. The user may watch the video preview and decide to watch the VOD content instance in its entirety, save the VOD content instance to an instant queue for later access, and/or otherwise access the VOD content instance. At any point during the presentation of the video preview, the user may provide a channel surfing command (e.g., by pressing a channel up or channel down button on a remote control device) to change the VOD channel and view a video preview of a different VOD content instance identified in the VOD channel surfing list. The user may continue channel surfing in this manner until he or she discovers a VOD content instance that he or she would like to watch.

Management facility 104 may be further configured to provide one or more access options associated with a VOD content instance while a video preview of the VOD content instance is being presented by way of an access device associated with a user. The one or more access options may be presented within the same display interface (e.g., the same display screen or window) as the video preview, within a different display interface than the display screen displaying the video preview (e.g., by way of a companion device, such as a mobile device), and/or in any other manner as may serve a particular implementation.

Figure 6:
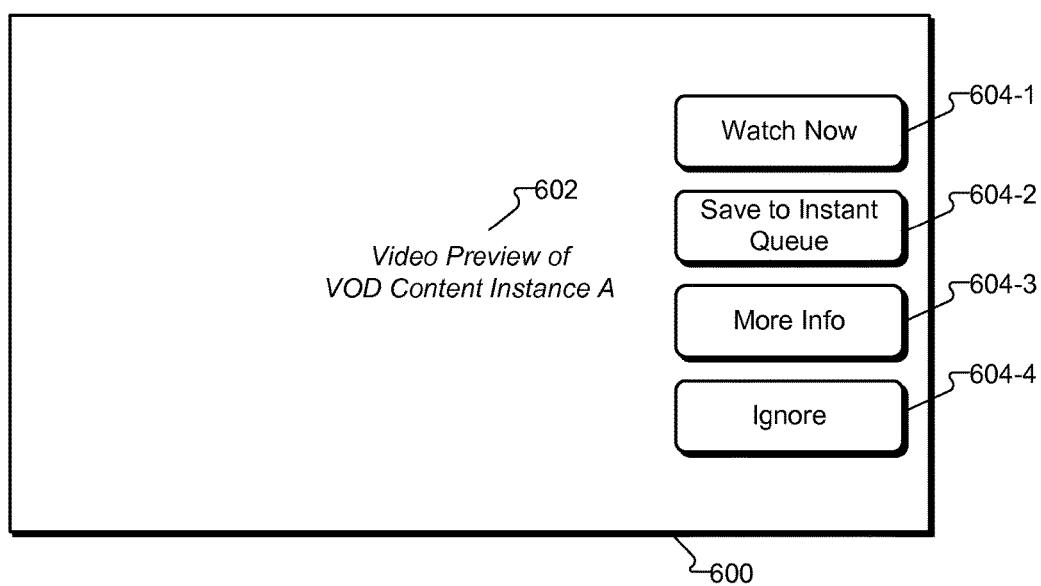
FIGS. 6-9 show various interfaces that may be presented in accordance with the methods and systems described herein.

To illustrate, FIG. 6 shows an exemplary display interface 600 upon which a video preview 602 of a VOD content instance labeled "VOD content instance A" may be presented. As shown, a plurality of access options 604 (e.g., access options 604-1 through 604-4) may also be presented within display interface 600. In response to a user selection of an option to view the VOD content instance (i.e., option 604-1), management facility 104 may initiate a presentation of the VOD content instance by way of the access device starting at a beginning of the VOD content instance (or at any other temporal position within the VOD content instance). In response to a user selection of option 604-2, management facility 104 may save the video content instance to an instant queue for later access by the user. In response to a user selection of option 604-3, management facility 104 may present additional information associated with the VOD content instance (e.g., a summary of the VOD content instance, one or more ratings of the VOD content instance, etc.). In response to a user selection of option 604-4, management facility 104 may remove the VOD content instance from the VOD channel surfing list. Additional or alternative access options may be presented within display interface 600 as may serve a particular implementation.

In some examples, a VOD content instance identified in a VOD channel surfing list may only be accessible if the user pays for access to the VOD content instance. For example, a user may be required to pay a fee to watch the VOD content instance. In these examples, at least one of the access options provided by management facility 104 may be configured to facilitate purchase by the user of access to the VOD content instance.

Figure 7:
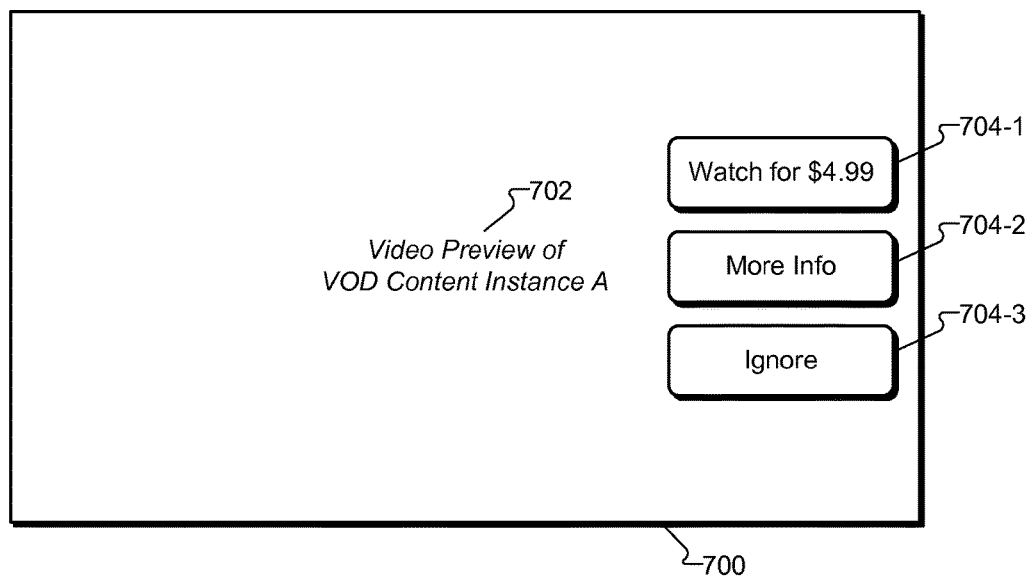

For example, FIG. 7 shows an exemplary display interface 700 upon which a video preview 702 of a VOD content instance labeled "VOD content instance A" may be presented. In this example, the VOD content instance may only be accessed if the user pays for access. Hence, as shown in FIG. 7, an access option 704-1 configured to facilitate purchase by the user of access to the VOD content instance may be provided for concurrent display within display interface 700. Other access options (e.g., access options 704-2 and 704-3) may also be presented within display interface 700 as may serve a particular implementation.

In some examples, management facility 104 may present a VOD channel surfing list within a GUI accessible by the user and provide (e.g., within the GUI) one or more options associated with the VOD content instances identified by the VOD channel surfing list.

Figure 8:
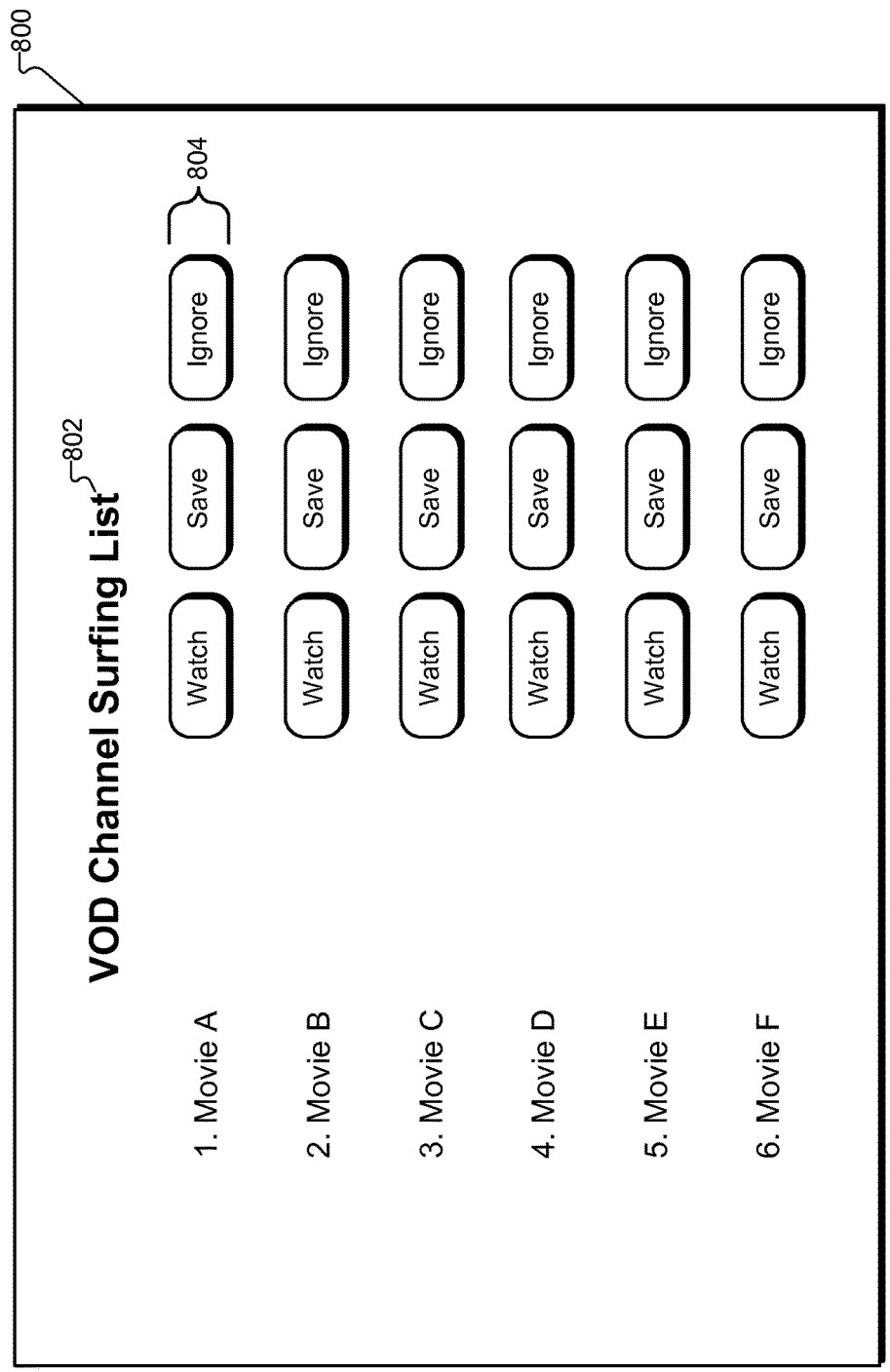

To illustrate, FIG. 8 shows an exemplary GUI 800 in which a VOD channel surfing list 802 may be presented. As shown, VOD channel surfing list 802 may include a list of movies (labeled "Movie A" through "Movie F"). One or more options (e.g., options 804) may be presented within GUI 800 together with each VOD content instance included in VOD channel surfing list 802. For example, a user may select one or more of options 804 to view, save, or ignore the VOD content instance labeled "Movie A".

In some examples, a presentation order of VOD content instances included in VOD channel surfing list 802 presented in GUI 800 may be based on a relative ranking of each VOD content instance in the list. For example, in the particular example of FIG. 8, the VOD content instance labeled "Movie A" is the highest ranked VOD content instance and the VOD content instance labeled "Movie F" is the lowest ranked VOD content instance. The ranking of each VOD content instance may be based on any suitable ranking heuristic and/or factor as may serve a particular implementation.

In some examples, management facility 104 may maintain a plurality of VOD channel surfing lists associated with a user of a media content access device. Each channel surfing list may be associated with a distinct channel surfing category (e.g., a distinct genre, mood of the user, etc.). In this manner, the user may select a particular channel surfing category depending on his or her mood or disposition towards a particular channel surfing category at any given moment.

To illustrate, management facility 104 may maintain a VOD content surfing list associated with comedies (i.e., the VOD content instances identified in the VOD channel surfing list have been categorized as comedies), a VOD content surfing list associated with romance (i.e., the VOD content instances identified in the VOD channel surfing list have been categorized as including romances), and a VOD content surfing list associated with adventure (i.e., the VOD content instances identified in the VOD channel surfing list have been categorized as including adventure content), a VOD content surfing list associated with a "happy" mood (i.e., the VOD content instances identified in the VOD channel surfing list have been categorized as including cheerful or happy content), a VOD content surfing list associated with a "bored" mood (i.e., the VOD content instances identified in the VOD channel surfing list have been categorized as including content that entertains the user), and/or any other VOD channel surfing list as may serve a particular implementation.

Figure 9:
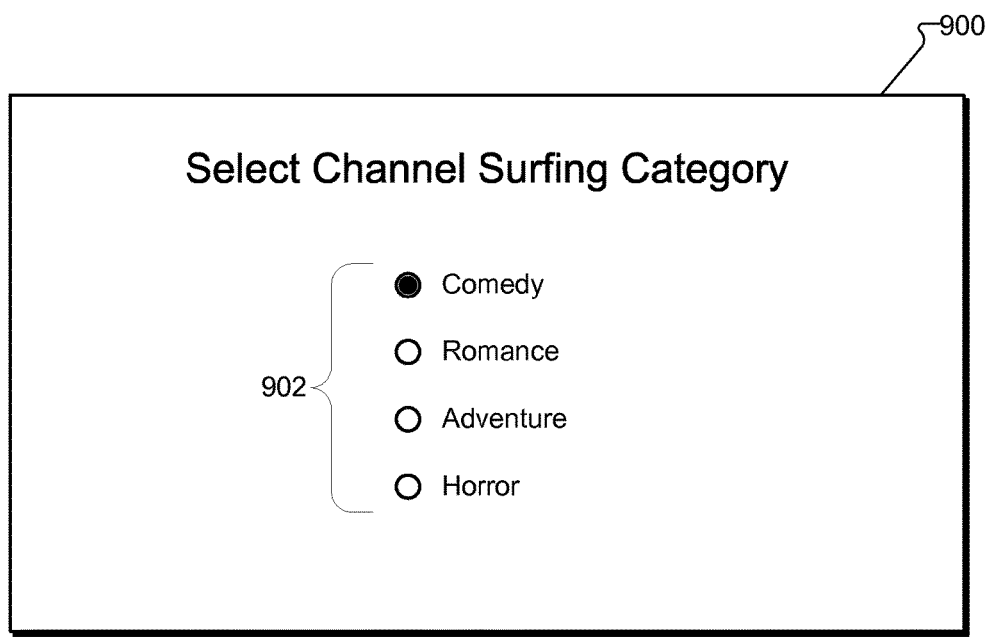

Management facility 104 may detect a user selection of a particular channel surfing category in any suitable manner. For example, FIG. 9 shows an exemplary GUI 900 that may be presented to the user and used to facilitate user selection of a channel surfing category from a plurality of channel surfing categories. As shown, a plurality of channel surfing categories 902 may be presented within GUI 900. In response to a user selection of one of the channel surfing categories 902 (e.g., the channel surfing category named "comedy"), management facility 104 may generate, identify, or otherwise use a VOD channel surfing list that is associated with the selected channel surfing category.

Returning to FIG. 1, storage facility 106 may be configured to maintain VOD channel surfing list data 108 and VOD content data 110. VOD channel surfing list data 108 may be representative of one or more VOD channel surfing lists and VOD content may be representative of or otherwise associated with VOD content. It will be recognized that storage facility 106 may maintain additional or alternative data as may serve a particular implementation.

Figure 10:
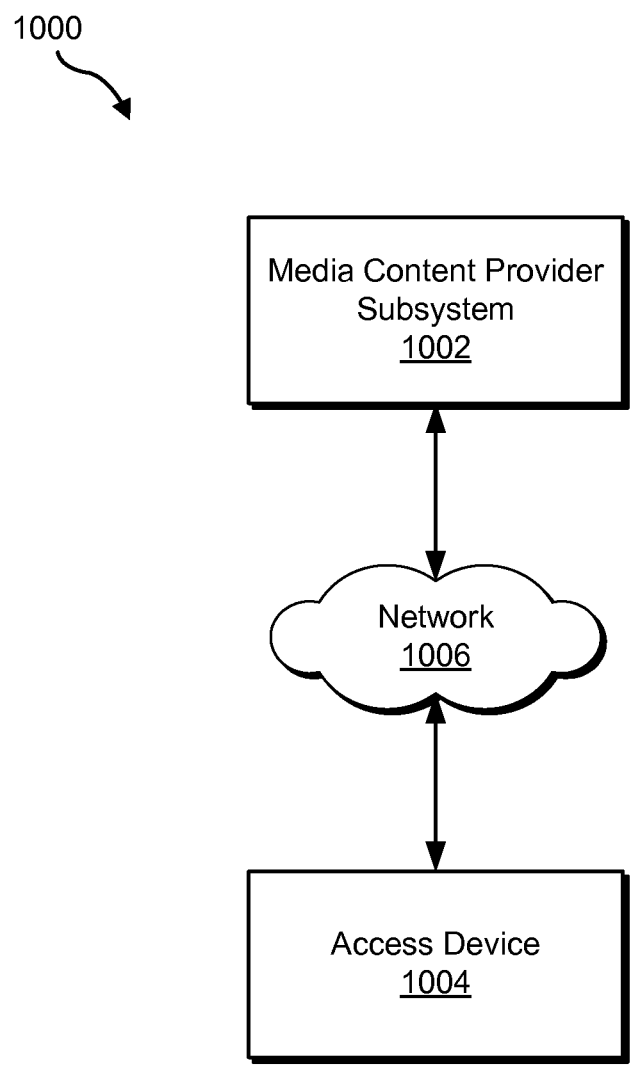
FIG. 10 illustrates an exemplary implementation of the system of FIG. 1 according to principles described herein.

FIG. 10 illustrates an exemplary implementation 1000 of system 100 wherein a media content provider subsystem 1002 is communicatively coupled to an access device 1004 by way of a network 1006. As will be described in more detail below, detection facility 102, VOD content management facility 104, and storage facility 106 may each be implemented by media content provider subsystem 1002 and/or access device 1004.

Media content provider subsystem 1002 may be associated with a service provider (e.g., a subscriber television service provider, an Internet service provider, a VOD content service provider, etc.) and/or any other type of media content provider. Accordingly, media content provider subsystem 1002 may be configured to provide one or more media content services (e.g., television services, VOD services, Internet services, application services, etc.) to access device 1004. For example, media content provider subsystem 1002 may be configured to manage (e.g., maintain, process, distribute, and/or generate) VOD content configured to be delivered to access device 1004. Media content provider subsystem 1002 may be implemented by one or more computing devices as may serve a particular implementation.

Additionally or alternatively, media content provider subsystem 1002 may be implemented by one or more third party servers configured to manage VOD content, interface with one or more social media service provider subsystems, and/or perform any other operation associated with the methods and systems described herein.

Access device 1004 may facilitate access by a user to VOD content provided by media content provider subsystem 1002. For example, access device 1004 may be configured to perform one or more access events at the direction of a user. To illustrate, access device 1004 may present a VOD content instance at the direction of a user.

Access device 1004 may be implemented by any suitable combination of media content processing or computing devices ("processing devices"). For example, access device 1004 may be implemented by one or more set-top box devices, digital video recording ("DVR") devices, personal computers, mobile devices (e.g., mobile phones and/or tablet computers), personal-digital assistant devices, gaming devices, television devices, etc.

Media content provider subsystem 1002 and access device 1004 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 1002 and access device 1004 may communicate using any suitable network. For example, as shown in FIG. 10, media content provider subsystem 1002 and access device 1004 may be configured to communicate with each other by way of network 1006. Network 1006 may include one or more networks or types of networks capable of carrying communications and/or data signals between media content provider subsystem 1002 and access device 1004. For example, network 1006 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 1002 or by access device 1004. In other embodiments, components of system 100 may be distributed across media content provider subsystem 1002 and access device 1004.

Figure 11:
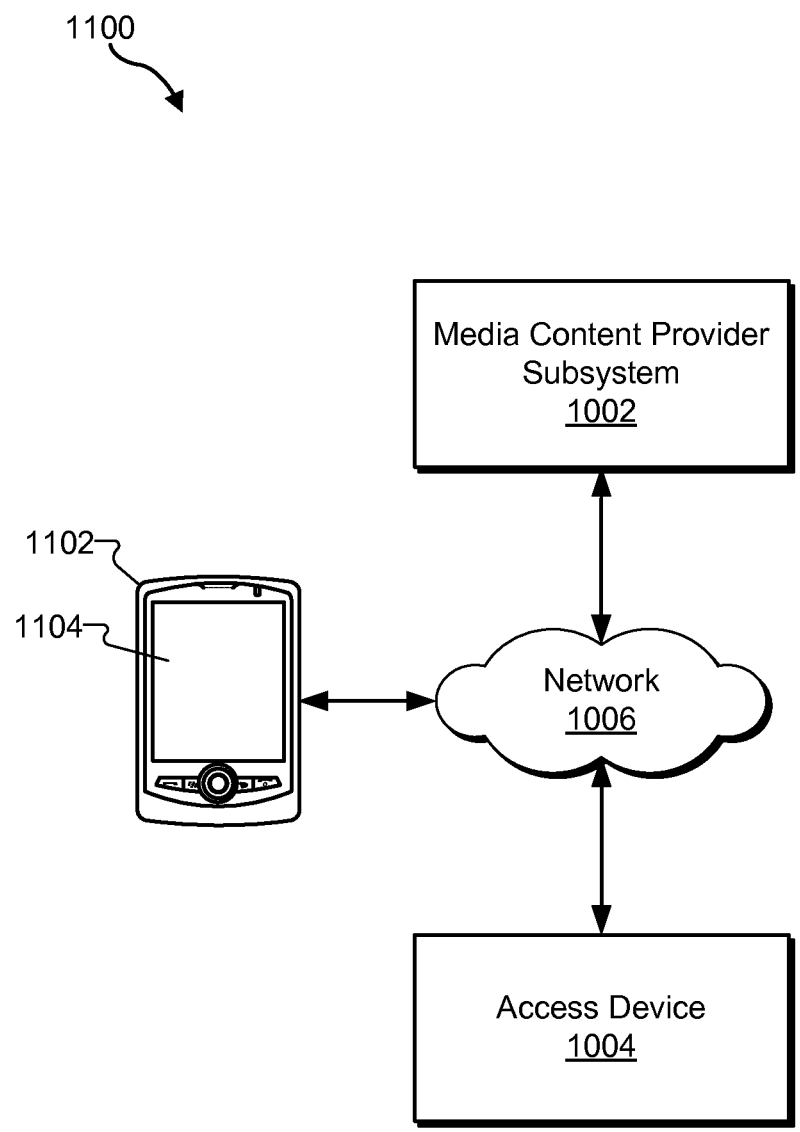
FIG. 11 illustrates another exemplary implementation of the system of FIG. 1 according to principles described herein.

FIG. 11 illustrates another exemplary implementation 1100 of system 100. Implementation 1100 is similar to implementation 1000 in that it includes media content provider subsystem 1002 and access device 1004 configured to communicate by way of network 1006. However, implementation 1100 further includes a mobile device 1102 configured to emulate a remote control device (e.g., by displaying GUI 300 within display screen 1104) associated with access device 1004. As shown, mobile device 1102 may communicate with access device 1004 by way of network 1006 (e.g., by way of a home Wi-Fi network or the like), and may utilize any suitable communication technologies, devices, media, and protocols supportive of data communications.

Figure 12:
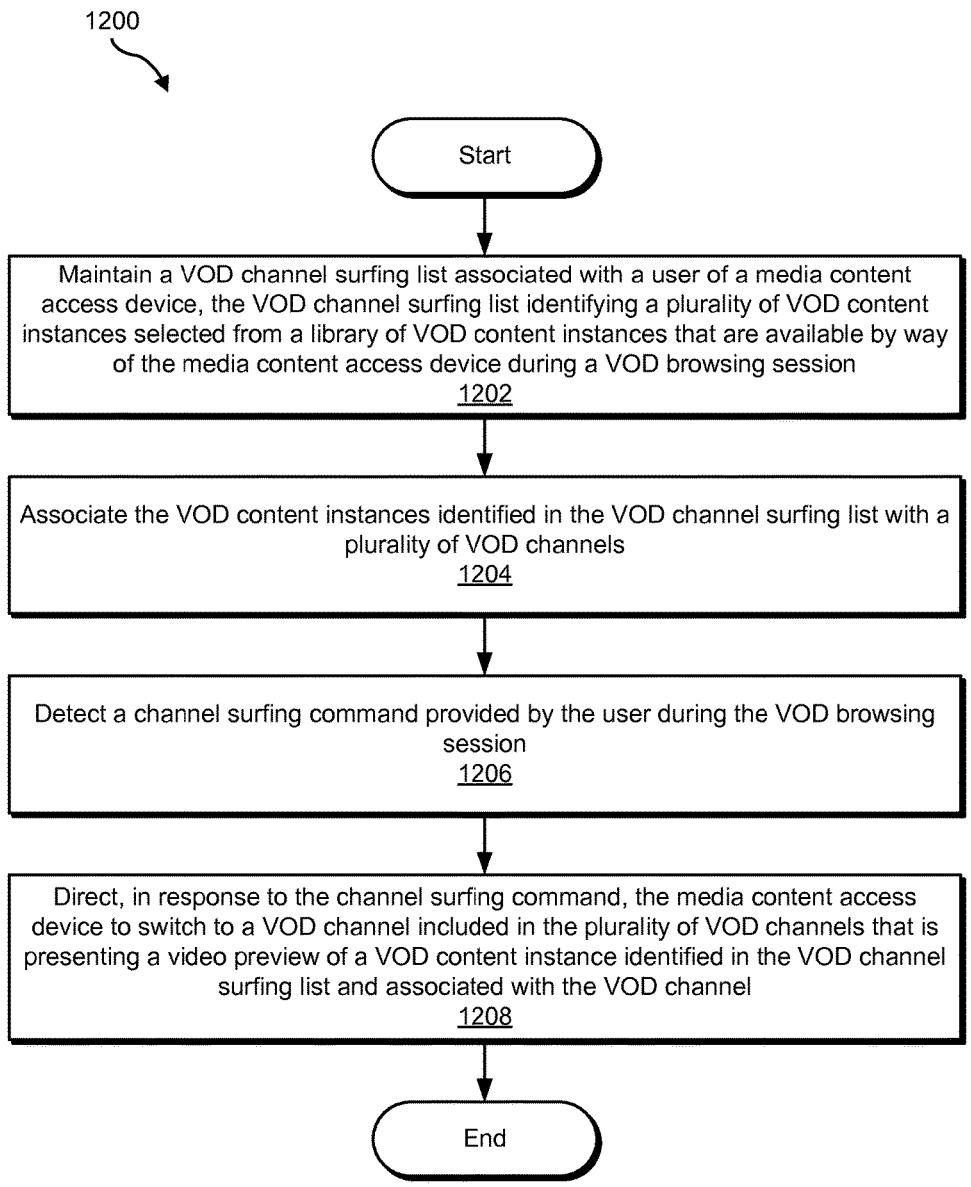
FIG. 12 illustrates an exemplary VOD content based channel surfing method according to principles described herein.

FIG. 12 illustrates an exemplary VOD content based channel surfing method 1200. While FIG. 12 illustrates exemplary steps according to one embodiment, other embodiments may omit, add to, reorder, and/or modify any of the steps shown in FIG. 12. One or more of the steps shown in FIG. 12 may be performed by system 100 and/or any implementation thereof.

In step 1202, a media content presentation system maintains a VOD channel surfing list associated with a user of a media content access device. As described above, the VOD channel surfing list identifies a plurality of VOD content instances selected from a library of VOD content instances that are available by way of the media content access device during a VOD browsing session. Step 1202 may be performed in any of the ways described herein.

In step 1204, the media content presentation system associates the VOD content instances identified in the VOD channel surfing list with a plurality of VOD channels. Step 1204 may be performed in any of the ways described herein.

In step 1206, the media content presentation system detects a channel surfing command provided by the user during the VOD browsing session. Step 1206 may be performed in any of the ways described herein.

In step 1208, the media content presentation system directs, in response to the channel surfing command, the media content access device to switch to a VOD channel included in the plurality of VOD channels that is presenting a video preview of a VOD content instance identified in the VOD channel surfing list and associated with the VOD channel. Step 1208 may be performed in any of the ways described herein.

Figure 13:
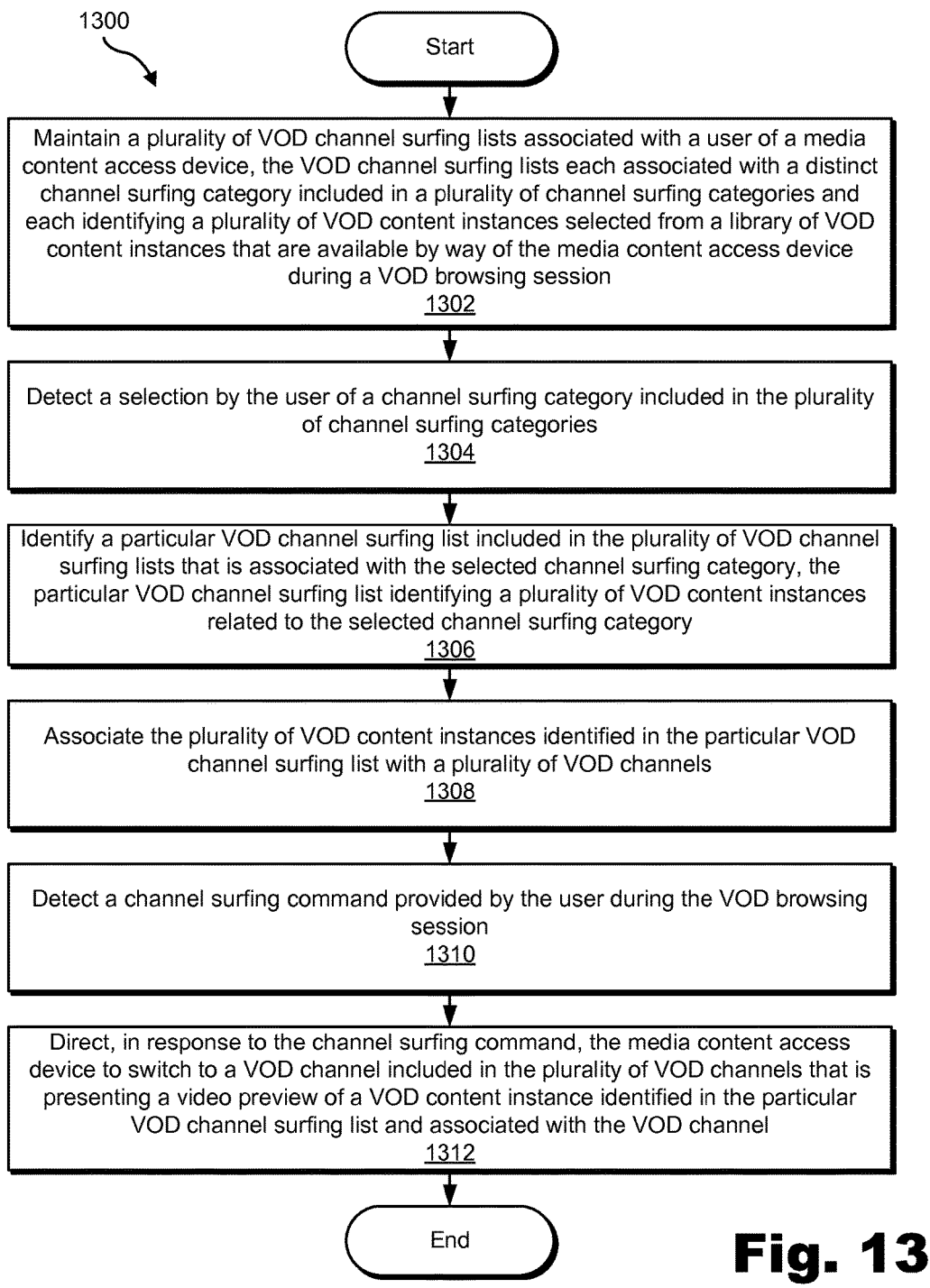
FIG. 13 illustrates another exemplary VOD content based channel surfing method according to principles described herein.

FIG. 13 illustrates another exemplary VOD content based channel surfing method 1300. While FIG. 13 illustrates exemplary steps according to one embodiment, other embodiments may omit, add to, reorder, and/or modify any of the steps shown in FIG. 13. One or more of the steps shown in FIG. 13 may be performed by system 100 and/or any implementation thereof.

In step 1302, a media content presentation system maintains a plurality of VOD channel surfing lists associated with a user of a media content access device. As described above, the VOD channel surfing lists are each associated with a distinct channel surfing category included in a plurality of channel surfing categories and each identify a plurality of VOD content instances selected from a library of VOD content instances that are available by way of the media content access device during a VOD browsing session. Step 1302 may be performed in any of the ways described herein.

In step 1304, the media content presentation system detects a selection by the user of a channel surfing category included in the plurality of channel surfing categories. Step 1304 may be performed in any of the ways described herein.

In step 1306, the media content presentation system identifies a particular VOD channel surfing list included in the plurality of VOD channel surfing lists that is associated with the selected channel surfing category, the particular VOD channel surfing list identifying a plurality of VOD content instances related to the selected channel surfing category. Step 1306 may be performed in any of the ways described herein.

In step 1308, the media content presentation system associates the plurality of VOD content instances identified in the particular VOD channel surfing list with a plurality of VOD channels. Step 1308 may be performed in any of the ways described herein.

In step 1310, the media content presentation system detects a channel surfing command provided by the user during the VOD browsing session. Step 1310 may be performed in any of the ways described herein.

In step 1312, the media content presentation system directs, in response to the channel surfing command, the media content access device to switch to a VOD channel included in the plurality of VOD channels that is presenting a video preview of a VOD content instance identified in the particular VOD channel surfing list and associated with the VOD channel. Step 1312 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
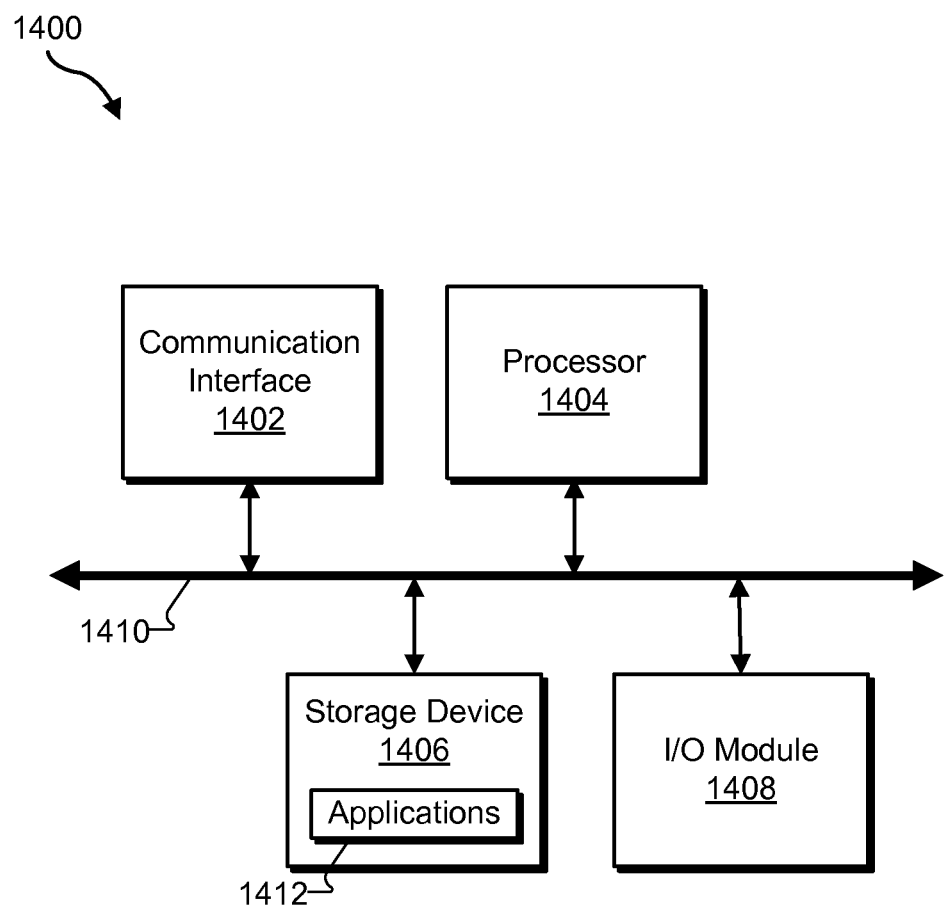
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein.

Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with detection facility 102 and/or VOD content management facility 104. Likewise, storage facility 106 may be implemented by or within storage device 1406.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    maintaining, by a media content presentation system, a video-on-demand ("VOD") channel surfing list associated with a user of a media content access device, the VOD channel surfing list identifying a plurality of VOD content instances selected from a library of VOD content instances that are available by way of the media content access device during a VOD browsing session;
    associating, by the media content presentation system, the VOD content instances identified in the VOD channel surfing list with a plurality of VOD channels that are accessible by the user by way of the media content access device during the VOD browsing session;
    detecting, by the media content presentation system, a channel surfing command provided by the user during the VOD browsing session; and
    directing, by the media content presentation system in response to the channel surfing command, the media content access device to switch to a VOD channel included in the plurality of VOD channels that is presenting a video preview of a VOD content instance identified in the VOD channel surfing list and associated with the VOD channel;
    wherein the maintaining of the VOD channel surfing list comprises:
        determining that the user pauses channel surfing for a period of time to view the video preview of the VOD content instance;
        identifying, based on the determining that the user pauses the channel surfing for the period of time to view the video preview of the VOD content instance, a particular VOD content instance not already included in the VOD channel surfing list and that shares one or more attributes with the VOD content instance as being potentially of interest to the user; and
        including the particular VOD content instance in the VOD channel surfing list by
            assigning the particular VOD content instance identified as being potentially of interest to the user to a particular VOD channel, and
            including the particular VOD channel in the plurality of VOD channels that are accessible by the user by way of the media content access device during the VOD browsing session.

2. The method of claim 1, further comprising:
    detecting, by the media content presentation system, an additional channel surfing command provided by the user during the VOD browsing session subsequent to the channel surfing command; and
    directing, by the media content presentation system in response to the additional channel surfing command, the media content access device to switch from the VOD channel to an additional VOD channel included in the plurality of VOD channels that is presenting a video preview of an additional VOD content instance identified in the VOD channel surfing list and associated with the additional VOD channel.

3. The method of claim 2, further comprising:
  detecting, by the media content presentation system, a third channel surfing command provided by the user during the VOD browsing session subsequent to the additional channel surfing command, the third channel surfing command configured to direct the media content access device to switch back to the VOD channel;
  directing, by the media content presentation system in response to the third channel surfing command, the media content access device to switch from the additional VOD channel back to the VOD channel; and
  providing, by the media content presentation system, an additional video preview of the VOD content instance that is different than the video preview of the VOD content instance for presentation by way of the VOD channel in response to the media content access device switching back to the VOD channel.

4. The method of claim 1, further comprising:
  detecting, by the media content presentation system, a command provided by the user to initiate the VOD browsing session prior to the channel surfing command being provided by the user; and
  directing, by the media content presentation system in response to the command to initiate the VOD browsing session, the media content access device to switch to an additional VOD channel included in the plurality of VOD channels that is presenting a video preview of an additional VOD content instance identified in the VOD channel surfing list and associated with the additional VOD channel;
  wherein the directing of the media content access device to switch to the VOD channel that is presenting the video preview of the VOD content instance comprises directing the media content access device to switch from the additional VOD channel to the VOD channel.

5. The method of claim 1, further comprising providing, by the media content presentation system, one or more access options associated with the VOD content instance while the video preview of the VOD content instance is being presented.

6. The method of claim 5, wherein the one or more access options includes an option to view the VOD content instance, and wherein the method further comprises:
  detecting, by the media content presentation system, a selection by the user of the option to view the VOD content instance; and
  initiating, by the media content presentation system, a presentation of the VOD content instance by way of the media content access device starting at a beginning of the VOD content instance.

7. The method of claim 1, wherein the identifying of the particular VOD content instance as being potentially of interest to the user is further based on one or more preferences specified by the user.

8. The method of claim 1, wherein the identifying of the particular VOD content instance as being potentially of interest to the user is further based on a viewing history associated with the user.

9. The method of claim 1, wherein the identifying of the particular VOD content instance as being potentially of interest to the user is further based on at least one of a user profile associated with the user, a popularity of the particular VOD content instance, and one or more metadata values associated with the particular VOD content instance.

10. The method of claim 1, further comprising providing, by the media content presentation system, the video preview of the VOD content instance for presentation by way of the VOD channel.

11. The method of claim 10, wherein the providing of the video preview comprises streaming the video preview of the VOD content instance by way of the VOD channel in accordance with an always-on video presentation heuristic.

12. The method of claim 1, wherein the video preview of the VOD content instance comprises a trailer of the VOD content instance or an in-progress presentation of the VOD content instance.

13. The method of claim 1, further comprising:
  presenting, by the media content presentation system, the VOD channel surfing list within a graphical user interface accessible by the user; and
  providing, by the media content presentation system within the graphical user interface, one or more options associated with the VOD content instances identified by the VOD channel surfing list.

14. The method of claim 1, further comprising:
  detecting, by the media content presentation system, a selection by the user of a channel surfing category;
  wherein the maintaining of the VOD channel surfing list comprises generating the VOD channel surfing list in accordance with the selected channel surfing category.

15. The method of claim 1, embodied as computer-executable instructions on at least one non-transitory computer-readable medium.

16. The method of claim 1, further comprising:
  personalizing, by the media content presentation system, the video preview of the VOD content instance to the user by:
  identifying a portion of the VOD content instance as being potentially of interest to the user based on at least one of a user profile associated with the user, a viewing history associated with the user, and a preference specified by the user, wherein the identified portion of the VOD content instance includes only a subset of a total number of scenes included in the VOD content instance and wherein a total number of scenes included in the subset is less than the total number of scenes included in the VOD content instance, and
  designating the identified portion as the video preview of the VOD content instance.

17. The method of claim 1, wherein the identifying of the particular VOD content instance as being potentially of interest to the user is further based on contents of an instant queue of VOD content instances maintained by the user.

18. The method of claim 1, wherein the identifying of the particular VOD content instance as being potentially of interest to the user is further based on activity of one or more social media contacts of the user.

19. The method of claim 1, further comprising:
  detecting, by the media content presentation system, an additional channel surfing command provided by the user during the VOD browsing session subsequent to the channel surfing command; and
  directing, by the media content presentation system in response to the additional channel surfing command, the media content access device to switch from the VOD channel to the particular VOD channel included in the plurality of VOD channels and to present, by way of the particular VOD channel, a video preview of the particular VOD content instance identified as being potentially of interest to the user.

20. A method comprising:
maintaining, by a media content presentation system, a plurality of video-on-demand ("VOD") channel surfing lists associated with a user of a media content access device, the VOD channel surfing lists each associated with a distinct channel surfing category included in a plurality of channel surfing categories and each identifying a plurality of VOD content instances selected from a library of VOD content instances that are available by way of the media content access device during a VOD browsing session;
detecting, by the media content presentation system, a selection by the user of a channel surfing category included in the plurality of channel surfing categories;
identifying, by the media content presentation system, a particular VOD channel surfing list included in the plurality of VOD channel surfing lists that is associated with the selected channel surfing category, the particular VOD channel surfing list identifying a plurality of VOD content instances related to the selected channel surfing category;
associating, by the media content presentation system, the plurality of VOD content instances identified in the particular VOD channel surfing list with a plurality of VOD channels that are accessible by the user by way of the media content access device during the VOD browsing session;
detecting, by the media content presentation system, a channel surfing command provided by the user during the VOD browsing session; and
directing, by the media content presentation system in response to the channel surfing command, the media content access device to switch to a VOD channel included in the plurality of VOD channels that is presenting a video preview of a VOD content instance identified in the particular VOD channel surfing list and associated with the VOD channel;
wherein the maintaining of the plurality of VOD channel surfing lists comprises:
  determining that the user pauses channel surfing for a period of time to view the video preview of the VOD content instance;
  identifying, based on the determining that the user pauses the channel surfing for the period of time to view the video preview of the VOD content instance, a particular VOD content instance not already included in the VOD channel surfing list and that shares one or more attributes with the VOD content instance as being potentially of interest to the user; and
  including the particular VOD content instance in one or more of the plurality of VOD channel surfing lists by assigning the particular VOD content instance identified as being potentially of interest to the user to a particular VOD channel, and
    including the particular VOD channel in the plurality of VOD channels that are accessible by the user by way of the media content access device during the VOD browsing session.

21. The method of claim 20, embodied as computer-executable instructions on at least one non-transitory computer-readable medium.

22. A system comprising:
a video-on-demand ("VOD") content management facility that:
  maintains a VOD channel surfing list associated with a user of a media content access device, the VOD channel surfing list identifying a plurality of VOD content instances selected from a library of VOD content instances that are available by way of the media content access device during a VOD browsing session, and
  associates the VOD content instances identified in the VOD channel surfing list with a plurality of VOD channels that are accessible by the user by way of the media content access device during the VOD browsing session; and
a detection facility communicatively coupled to the VOD content management facility and that detects a channel surfing command provided by the user during the VOD browsing session;
wherein the VOD content management facility:
  directs, in response to the channel surfing command, the media content access device to switch to a VOD channel included in the plurality of VOD channels that is presenting a video preview of a VOD content instance identified in the VOD channel surfing list and associated with the VOD channel; and
  maintains the VOD channel surfing list by:
    determining that the user pauses channel surfing for a period of time to view the video preview of the VOD content instance;
    identifying, based on the determining that the user pauses the channel surfing for the period of time to view the video preview of the VOD content instance, a particular VOD content instance not already included in the VOD channel surfing list and that shares one or more attributes with the VOD content instance as being potentially of interest to the user; and
    including the particular VOD content instance in the VOD channel surfing list by
      assigning the particular VOD content instance identified as being potentially of interest to the user to a particular VOD channel, and
      including the particular VOD channel in the plurality of VOD channels that are accessible by the user by way of the media content access device during the VOD browsing session.

* * * * *